Aug. 12, 1969 R. SIEFERT 3,460,340

TUNING FORK OR SIMILAR DRIVEN OSCILLATOR

Filed Jan. 30, 1967

United States Patent Office 3,460,340

Patented Aug. 12, 1969

3,460,340

TUNING FORK OR SIMILAR DRIVEN OSCILLATOR

Roland Siefert, Bad Durrheim, Germany, assignor to Kienzle Uhrenfabriken G.m.b.H., Schwenningen am Neckar, Germany, a limited-liability company of Germany Filed Jan. 30, 1967, Ser. No. 612,426

Claims priority, application Germany, Feb. 10, 1966, K 58,382

Int. Cl. G04c *3/00*

U.S. Cl. 58—23 3 Claims

ABSTRACT OF THE DISCLOSURE

The invention is a low frequency tuning fork provided with backwardly turned extensions of the tines of the fork, the extensions carrying magnetic means for cooperation with a drive coil.

The present invention relates to a tuning fork or similar driven oscillator having two tines operating in mirror image symmetry to each other. Tuning forks or conventional design and normal production tolerance exhibit inherent differences which are larger as the vibration frequency decreases. On account of the inherent differences one is compelled to resort, if possible, to the use of higher frequencies wherever the desired effect of the high frequency vibration can be subsequently reduced, for example in the mechanical drive of a clockwork by a vibrating fork. This however has the drawback that the mechanical take off from the fork for the clockwork presents serious difficulties.

In the case of tuning forks operating at high frequencies the amplitude is of course very, very small so that movement for conversion into an equal amount of turning movement is necessarily very small and requires precision elements of construction.

Tuning forks are usually electrically driven and the timing of the drive current is controlled by either a regulator pick up coil or an EMF on part of the drive coil.

Natural frequency investigations at 50 c.p.s. with the ordinary U shaped tuning fork have shown that the fork will vary the equivalent of ±120 sec. a day in number of cycles. By using a frequency at about 300 c.p.s. this variation is reduced to several seconds. However when the frequency of a tuning fork is up to 100 c.p.s. serious difficulties arise with respect to driven elements of the clockwork.

An object of the present invention is to overcome this drawback, that is, to provide a tuning fork having a low frequency and for which also gain and delay are greatly reduced.

These objects are obtained in a tuning fork having two mirror image prongs having end portions developed or bent backwardly toward the node of the fork.

The free ends can lie outer or inner of the main or mounted prongs of the fork.

The tuning fork is magnetically driven, preferably controlled by a solid state electronic switching system. The electrodynamic exciting and drive system on the ends of both prongs can be actuated by the same coil. Indeed in the invention using electronic switching, one coil serves simultaneously as the exciting and drive winding.

Tests on such a tuning fork showed that the deviation was reduced down to zero. A comparison conventional fork having straight parallel prongs was off by ±120 sec./day as noted above. In both cases the forks were produced from resilient strip material, substantially unaffected by thermal expansion, measuring 0.6 x 2 mm. It is preferable to have the bent prongs inner of the mounted portion of the prongs. Only one coil is necessary for maintaining the fork in a state of vibration. This coil has a relatively large dimension and is of rather large gauge wire and hence cheap. Since the two magnet systems cooperate with the same coil, a rather high control voltage is obtained. The two magnetic systems mounted on the end portions of the prongs are preferably shielded so that they cannot mutually influence each other.

Figure 1:
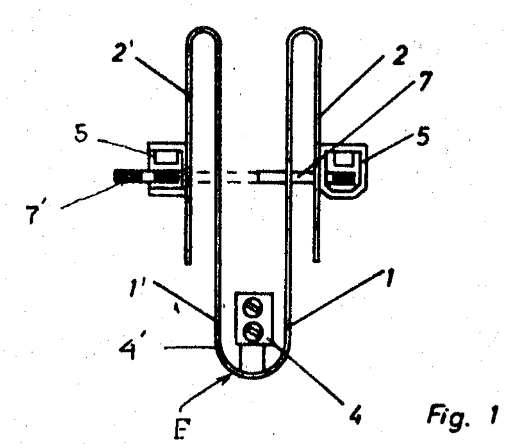
FIG. 1 shows a tuning fork having the end portions outer of the mounted portions of the prongs.

In FIG. 1 the fork F has two parallel main prongs 1 and 1' each having respective end portions 2 and 2' developed reversely parallel and extending toward the yoke portion 4' and parallel to the main prongs and outer therefrom. The yoke portion bears a nodal mounting means 4.

Figure 2:
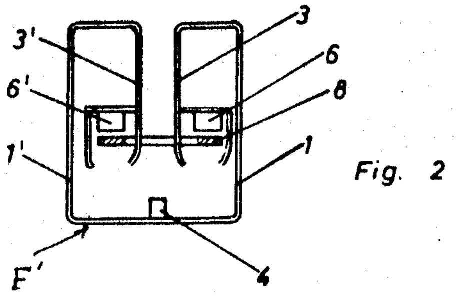
FIG. 2 shows a tuning fork having the end portions inner of the mounted portions of the prongs.
Figure 3:
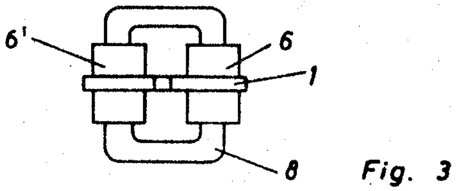
FIG. 3 is a plan of the fork of FIG. 2.

The fork F' of FIG. 2 is quite similar to the one shown in FIG. 1 except that the prong end portions 2 and 2' are situated inner from the main prongs.

Mutually shielded magnetic means such as permanent magnets 5 on the prong end portions 2 and 2' can be actuated by separate coils such as 7' as shown according to the left half of the fork of FIGURE 1. It is of advantage to employ only one coil, such as 7, to cooperate with the means 5 as may be done by the omission of coil 7' and using a larger coil 7. This is perhaps seen more clearly in connection with FIG. 2 as will be explained below. However one of the coils 7 and 7' may be a drive coil and the other a pickup or regulator coil.

In FIG. 2 the fork F' has prong end portions 3 and 3' turned inwardly with the magnetic means 6 and 6' thereon.

Both magnetic means 6 and 6' are adjacent and face and extend toward the nearly flat or planar coil 8 in the same sense or direction at opposite coil portions.

The tuning fork may be of different shapes from those shown wherein shown shapes are essentially portions of a more complex construction. For instance, it is known that a simple U-shaped fork is a portion of an H-shaped fork. The present invention contemplates the provision of reverse extensions on any generally symmetrical vibratory prongs joined at a nodal portion.

The invention claimed is:

1. A tuning fork having mirror image main tines joined by a nodal portion and provided with extensions of the tines reversely turned and extending generally backward toward the nodal portion, mutually shielded magnets on the respective extensions and only one inductor coil near and in inductive cooperation with the magnets.

2. A tuning fork as claimed in claim 1, said extensions being inner of the main tines, said magnets being shielded to permit the magnets to be nearer each other for the same degree of mutual interaction.

3. A tuning fork as claimed in claim 2, said coil being essentially planar and the magnets projecting in the same direction toward the plane of the coil and adjacent thereto, the magnets being situated near perimetrically opposite portions of the coil.

References Cited

UNITED STATES PATENTS

| | | | |
|---|---|---|---|
| 3,192,701 | 7/1965 | Tanaka et al. -------- | 310—25 |
| 3,277,394 | 10/1966 | Holt et al. | |

RICHARD B. WILKINSON, Primary Examiner

EDITH C. SIMMONS, Assistant Examiner

U.S. Cl. X.R.

84—457; 310—25; 331—156